United States Patent
Lamberson et al.

(10) Patent No.: US 10,418,874 B2
(45) Date of Patent: Sep. 17, 2019

(54) METHODS AND SYSTEM FOR CREATING SPACING BETWEEN INSULATED COILS OF ELECTRODYNAMIC MACHINES

(71) Applicant: Siemens Industry, Inc., Alpharetta, GA (US)

(72) Inventors: Ross Patrick Lamberson, Cincinnati, OH (US); Timothy David Beatty, Middletown, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 507 days.

(21) Appl. No.: 15/210,147

(22) Filed: Jul. 14, 2016

(65) Prior Publication Data
US 2018/0019631 A1    Jan. 18, 2018

(51) Int. Cl.
H02K 3/28    (2006.01)
H02K 15/00   (2006.01)

(52) U.S. Cl.
CPC ........... *H02K 3/28* (2013.01); *H02K 15/0031* (2013.01)

(58) Field of Classification Search
CPC .... H02K 15/02; H02K 15/00; H02K 15/0031; H02K 3/28
USPC ............................................. 29/596; 310/10
See application file for complete search history.

(56) References Cited

U.S. PATENT DOCUMENTS

| | | | |
|---|---|---|---|
| 3,775,842 A | 12/1973 | Sheldon et al. | |
| 3,822,861 A * | 7/1974 | Scott | B28B 13/067 249/66.1 |
| 4,582,463 A * | 4/1986 | Schreiner | B65H 1/16 221/198 |
| 5,079,998 A | 1/1992 | Peterson et al. | |
| 5,344,284 A | 9/1994 | Delvaux et al. | |
| 6,160,761 A * | 12/2000 | Sansone | G01H 9/004 156/156 |
| 6,513,418 B1 * | 2/2003 | Simmons | F15B 15/103 254/93 HP |
| 6,792,239 B2 * | 9/2004 | Lee | G03G 15/2053 219/216 |
| 8,262,971 B2 | 9/2012 | Calvert | |
| 2005/0269895 A1 * | 12/2005 | Innami | B62D 5/0403 310/429 |
| 2005/0283971 A1 * | 12/2005 | Erpelding | G11B 5/5569 29/605 |
| 2009/0188569 A1 * | 7/2009 | Saltel | E21B 29/10 137/15.11 |

FOREIGN PATENT DOCUMENTS

CN    2721978 Y    8/2005

* cited by examiner

*Primary Examiner* — Peter Dungba Vo
*Assistant Examiner* — Kaying Kue

(57) ABSTRACT

Methods and system for creating spacing between insulated stator coils include a spacing device with an expandable container. The expandable container is positioned and expanded between stator coil end portions in order to create a space between the insulated stator coil end portions. Insulating elements are placed in the space created between the stator coil end portions, and the expandable container removed.

10 Claims, 4 Drawing Sheets

METHODS AND SYSTEM FOR CREATING SPACING BETWEEN INSULATED COILS OF ELECTRODYNAMIC MACHINES

BACKGROUND

1. Field

Aspects of the present invention generally relate to methods and system for creating spacing between insulated coils of electrodynamic machines, and in particular stator coils suitable for alternating current (AC) induction motors.

2. Description of the Related Art

Electrodynamic machines generate electromagnetic forces (EMF) between a rotor and stator that are in relative motion. The general physical principles, construction and operation of electrodynamic machines, for example AC induction motors, are known to those skilled in the art. Briefly described, a rotating magnetic field induced within poles formed within the stator generates electromagnetic force (EMF) that rotates the rotor and its attached shaft. Torque generated on the rotating shaft enables the machine to perform useful work.

An AC induction motor stator comprises a stator ring including a stack of annularly shaped stator lamina that form radial slots extending generally axially from one end of the stator to the other. The radial slots receive stator coils, also referred to as stator winding, that are arrayed in poles about the circumference of the stator ring. When the stator coils are energized by AC power, a rotating magnetic field is produced. The induced EMF in turn causes rotor and shaft rotation. Induction motors can be single-phase or multi-phase induction motors. As is well known in the art, individual stator coils are electrically isolated from their surrounding environment by a circumferential insulation layer, often a multi-layered combination of dielectric tape and hardened resin.

As noted before, the stator coils are received in the stator slots, wherein at each axial end of the stator slots, the coils protrude out of the ends of the stator slots. The portions of the coils that protrude out of the ends of the stator slots are referred to as coil end portions, coil ends or end windings. The coil end portions need to be properly placed and secured. Further, an adequate coil-to-coil clearance between adjacent coil end portions is necessary to provide electrical isolation between the coil end portions. Specifically, coil-to-coil clearance provides a minimum distance between coil end portions, particularly of those of different phases apart so that medium between the coil end portions will not ionize and damage the coils and/or the insulation system. Thus, between adjacent coil ends, insulating blocks or wedges are placed.

Different tools may be used when creating the coil-to-coil clearance and placing the insulating wedges, because the stators coil ends can be difficult to handle due to their sizes and diameters, especially in high voltage induction motors. But known tools, such as for example a z-bar, can create unwanted pressure points on adjacent coils if moved or rotated too far which can lead to damaged insulation and ultimately failed stators. Furthermore, the known z-bar is manually operated, and the repeated motion when creating the necessary torque to separate coils can create a safety concern by wearing on the operators' wrists, elbows and shoulders. Thus, a need exists in the art for improved methods and system for creating spacing between insulated coils, in particular coil end portions, for electrodynamic machines.

SUMMARY

Briefly described, aspects of the present invention relate to methods and system for creating spacing between insulated coils of electrodynamic machines, and in particular stator coils suitable for alternating current (AC) induction motors.

A first aspect of the present invention provides a method for creating spacing between insulated stator coils comprising positioning an expandable container comprising a first height between stator coil end portions at a first position; inflating the expandable container between the stator coil end portions at the first position to a second height thereby creating a first space between the stator coil end portions; and placing a first insulating element in the first space between the stator coil end portions.

A second aspect of the present invention provides a system for creating spacing between insulated stator coils comprising a spacing device comprising an expandable container, a regulator and a measuring device, the spacing device being adapted for creating spaces between insulated stator coil end portions, wherein the expandable container is positioned and expanded between the stator coil end portions in order to create a space between the insulated stator coil end portions.

A third aspect of the present invention provides a method for creating spacing between insulated coils comprising providing a spacing device comprising an expandable container; positioning the expandable container between coil end portions of insulated coils at a first position; expanding the expandable container between the coil end portions and creating a space between the coil end portions; and placing an insulating element in the space created between the coil end portions.

DETAILED DESCRIPTION

To facilitate an understanding of embodiments, principles, and features of the present invention, they are explained hereinafter with reference to implementation in illustrative embodiments. In particular, they are described in the context of methods and system for creating spacing between insulated coils of electrodynamic machines, in particular insulated stator coil end portions, suitable for alternating current (AC) induction motors. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
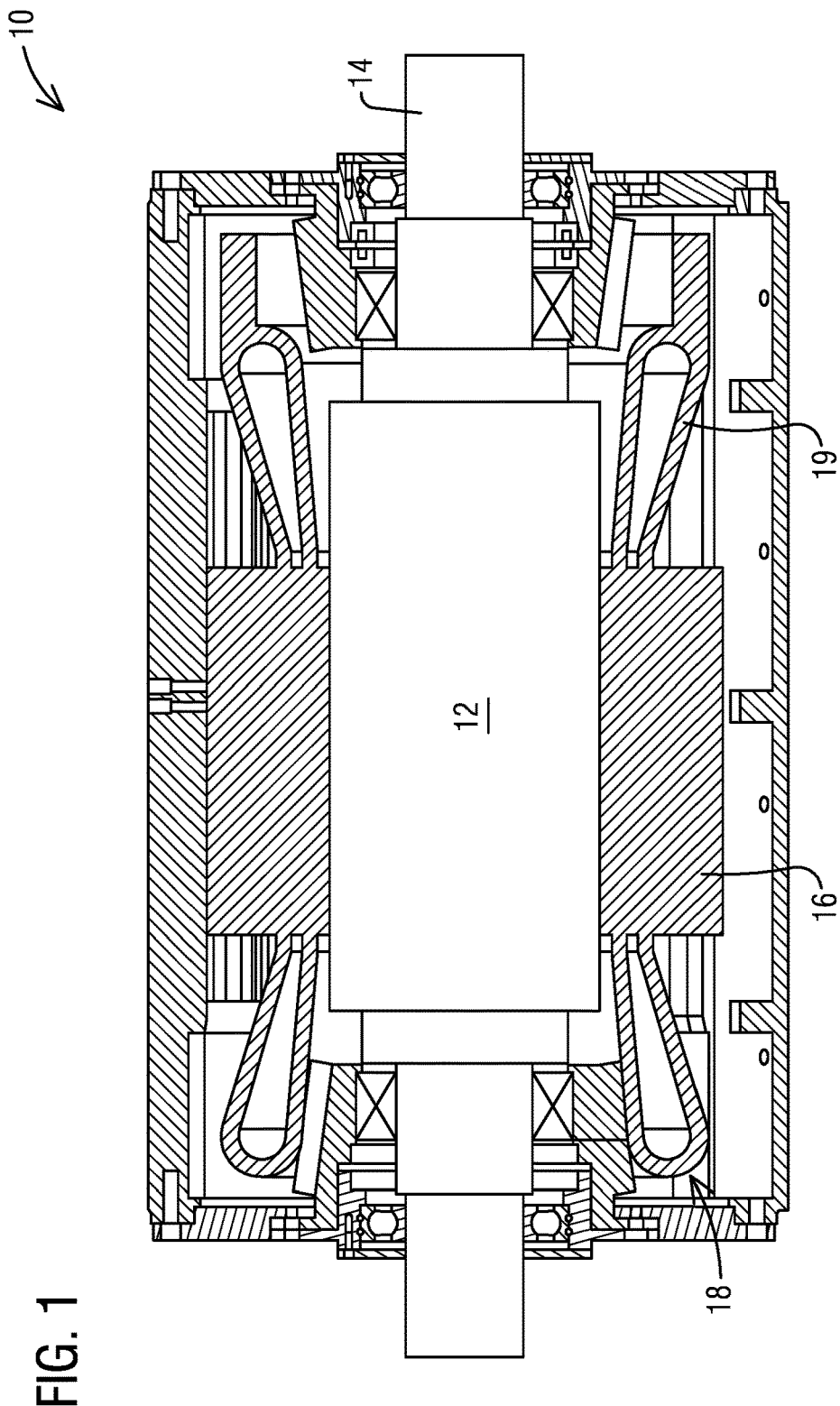
FIG. 1 is a perspective partial sectional view of a known induction motor.

FIG. 1 is a perspective partial sectional view of an induction motor 10. The general construction of an AC induction motor is known to those skilled in the art. Briefly described, the induction motor 10 includes a rotor 12 rotatively mounted therein on shaft 14. Stator 16 circumscribes the rotor 12 and includes stator coils 18. As described before, the stator 16 comprises radial slots extending generally axially from one end of the stator 16 to the other for receiving the stator coils 18. At each axial end of the stator slots of the stator 16, the coils 18 protrude out of the ends of the stator slots, herein referred to as coil end portions 19 (or simply end portions). Individual stator coils 18 including the coil end portions 19 are electrically isolated from their surrounding environment by a circumferential insulation layer.

Figure 2:
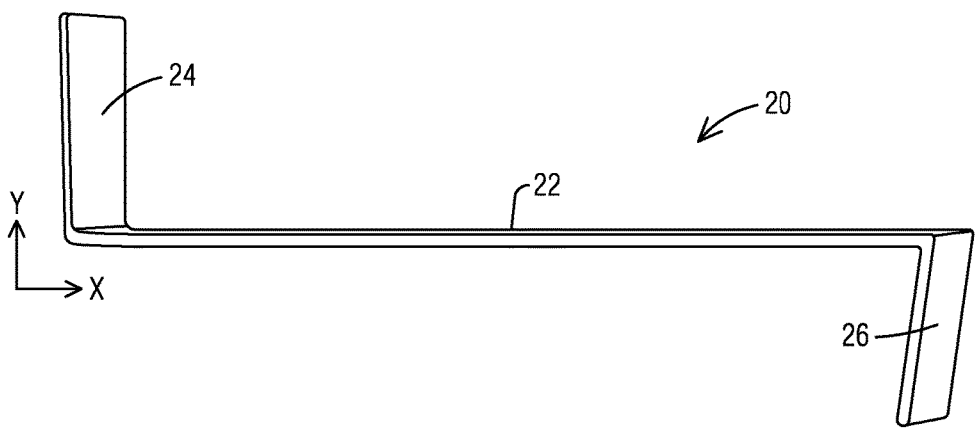
FIG. 2 is a perspective view of a known tool for creating spacing between coil end portions.

FIG. 2 is a perspective view of a z-bar 20 which is a known tool for creating spacing between coil end portions 19 as shown in FIG. 1. The coil end portions 19 need to be properly placed and secured. Further, an adequate coil-to-coil clearance between adjacent coil end portions 19 is necessary to provide electrical isolation between the coil end portions 19. Thus, between adjacent coil ends 19, insulating blocks or wedges are placed.

The z-bar 20 is typically made of metal and comprises a middle section 22, a first flange 24 and a second flange 26 which extend from the middle section 22 in opposite directions. The z-bar 20 is a manually operated tool and is used because the end portions 19 of the stators coils 18 can be difficult to handle due to their sizes and diameters.

Figure 3:
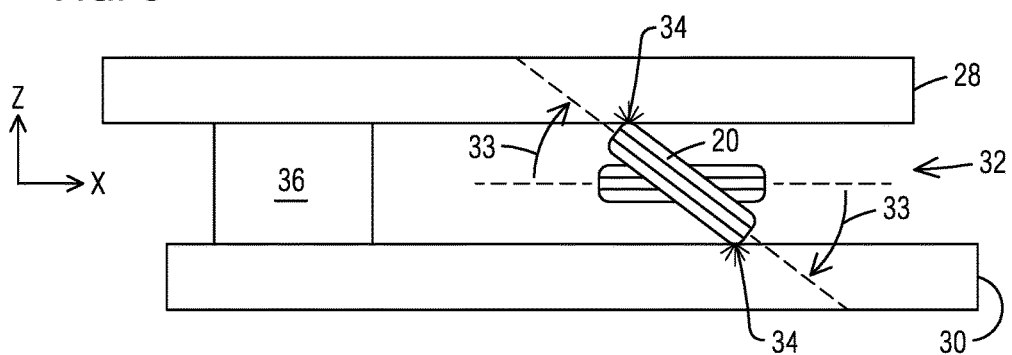
FIG. 3 is a top view of stator coil end portions when creating spacing between the stator coil end portions using the known tool as illustrated in FIG. 2.

FIG. 3 is a top view of a first stator coil end portion 28 and a second stator coil end portion 30 and z-bar 20 as introduced in FIG. 2 when creating spacing 32 between the stator coil end portions 28, 30. It should be noted that FIG. 3 is a simplified view of the stator coil end portions 28, 30 and z-bar 20.

The spacing 32 between the stator coil end portions 28, 30 is created manually by an operator using the z-bar 20. When creating the spacing 32, the z-bar 20 is placed by the operator between the two adjacent end portions 28, 30, and then rotated (see arrows 33 indicating rotation) in order to separate the end portions 28, 30 and increase space between the end portions 28, 30. When the spacing 32 is big enough for inserting an insulating element, one or more insulating elements, such as blocks or wedges 36 (only shown schematically) are inserted in the created spacing 32 and the z-bar 20 is removed. Using the wedges 36, a proper permanent clearance between the coil end portions 28, 30 is provided. But when rotating or moving the z-bar 20, unwanted pressure points 34 may be created on the coil end portions 28, 30 which can lead to damaged insulation and ultimately failed stators 16. Furthermore, the z-bar 20 is manually operated, and a repeated motion when creating the necessary torque to separate multiple coil end portions, can create a safety concern by wearing on the operators' wrists, elbows and shoulders.

Figure 4:
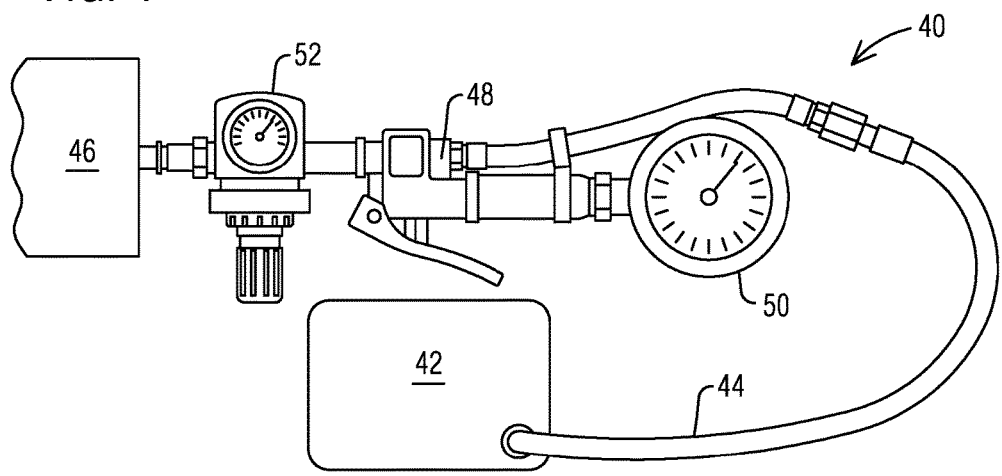
FIG. 4 illustrates an implementation of a spacing device in accordance with an exemplary embodiment of the present invention.

FIG. 4 illustrates an implementation of a spacing device in accordance with an exemplary embodiment of the present invention. Instead of the z-bar 20 as described in FIGS. 2-3, a spacing device 40 comprising an expandable container 42 for creating spacing between the insulated coil end portions 28, 30 is provided. As will be apparent from the following description, the spacing device 40 drastically reduces the opportunity for tool-related coil damage because a consistent surface area contact on coil end portions is created. Further, the spacing device 40 drastically reduces the risk of damaging the operators' joints by avoiding excessive torque on the current z-bar 20 while insulating elements 36 are installed.

The spacing device 40 can be configured as a pneumatic device or hydraulic equipment, wherein the pneumatic device is easier to implement, service and operate. In the following, the spacing device 40 is described as being a pneumatic device operated by compressed air or gas.

The spacing device 40 comprises an expandable container 42, specifically an inflatable container. The expandable container 42 is inflatable with a gas, for example air, specifically compressed air. But many other gases may be used for inflating the container 42 depending on availability. The expandable container 42 is herein also referred to as bladder or air bladder. The container 42 can comprise many different shapes and/or sizes depending on different requirements. In an exemplary embodiment of the present invention, the container 42 comprises a rectilinear shape comprising length, width and height. A rectilinear shape can comprise for example rectangular or square surfaces. Other examples for shapes for the container 42 can include shapes of a pillow, pyramid, wedge, bellows, sphere, cylinder, cone, torroid or "pancake donut" as well as shapes selected from the group consisting of round, oval, square, rectangle, trapezoid, pentagram, and a combination thereof.

The expandable container 42 is coupled to a hose 44 at one end, in particular a flexible hose, such as for example a flexible plastic hose, which is used for supplying the gas or air to the container 42. The other end of the hose 44 (herein also referred to as tubing) is for coupling to a gas supply 46. The gas supply 46 can comprise for example a tank with compressed air. The spacing device 40 further comprises a regulator 48 and a measuring device 50, such as for example a gauge, which are operably coupled to the hose 44 and are arranged between the inflatable container 42 and the gas supply 46 for regulating and monitoring the gas supplied to the container 42. With the regulator 48, input of the gas, i.e. air, to the container 42 is regulated, and pressure of the gas in the container 42 is monitored with the gauge 50. The regulator 48 as illustrated in FIG. 4 is manually operated. In an alternative embodiment, the regulator 48 can be an automatically operated regulator, wherein the container 42 can be inflated automatically according to for example a predefined gas volume and/or gas pressure for the container 42. FIG. 4 further illustrates a second gauge 52 coupled to the gas supply 46 for monitoring pressure of the gas in the gas supply 46.

According to an exemplary embodiment of the present invention, the expandable container 42 can be designed for an operating pressure up to 90 psi, and to exert a force of up to 300 lbs. Of course, the expandable container 42 can be designed for different operating pressures and/or output forces. For example, the operating pressure and/or output force can be increased, wherein material of the expandable container 42 and/or material of the tubing 44 can be changed to withstand a higher operating pressure which would in turn increase the output force. Material for the expandable container 42 can include but is not limited to rubber, synthetic elastomers, reinforced flexible composites, as well as film and coated fabrics including for example nitrile, urethane, vinyl, neoprene and fluoropolymers.

FIG. 4 illustrates the spacing device 40 in a simplified manner operated using gas, specifically compressed air. Main components of the spacing device 40 are the expandable container 42, the regulator 48 and the gauge 50. Of course, the spacing device 40 can comprise additional components, such as for example additional valves or actuators for providing some degree of automation of the spacing device 40 if desired. As noted before, in an alternative, the spacing device 40 may be a hydraulically operated device. Instead of a gas, a liquid, such as for example oil, may be used for expanding the expandable container 42.

Figure 5:
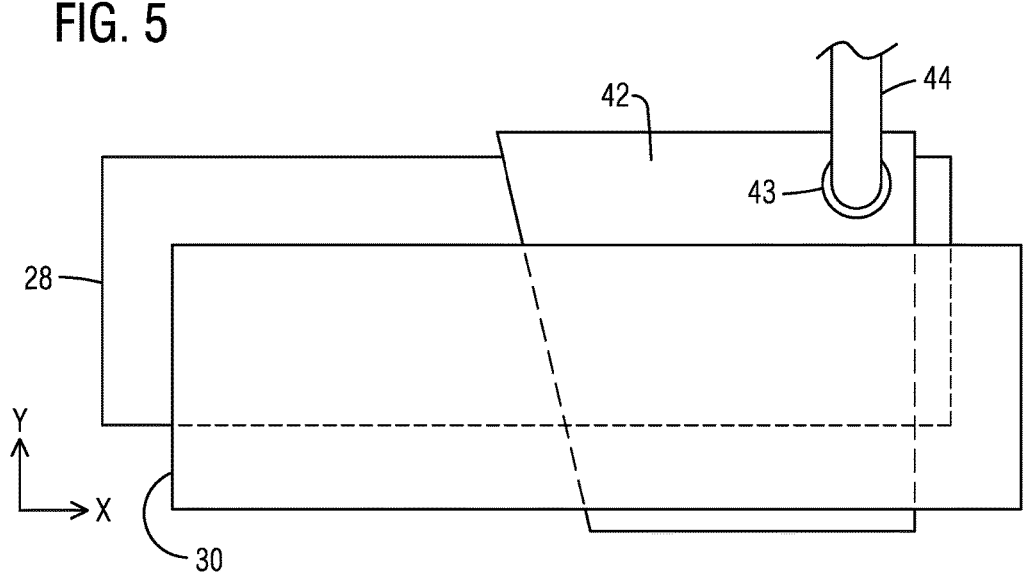
FIG. 5 is a front view and FIG. 6 is a top view of stator coil end portions when creating spacing between the end portions using the spacing device as described with reference to FIG. 4 in accordance with an exemplary embodiment of the present invention.
Figure 6:
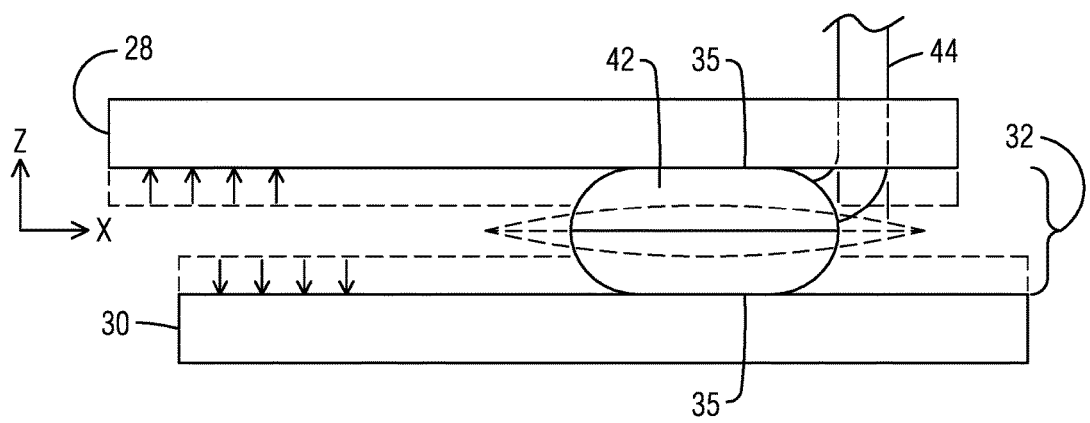

FIG. 5 is a front view and FIG. 6 is a top view of stator coil end portions when creating spacing between the end portions using the spacing device 40 as described with reference to FIG. 4 in accordance with an exemplary embodiment of the present invention.

As FIG. 5 schematically shows, the expandable container 42 comprises a single fitting 43 for connecting the hose 44 to the container 42. The fitting 43 can be configured according to a specified filling rate or filling speed. The fitting 43 is designed to provide a slow filling rate (filling speed) for the container 42 and is positioned close to a corner of the container 42. Of course, the fitting 43 can be positioned at many other points of the container 42. Also, the container 42 could comprise multiple fittings 43. In case of multiple fittings 43, the hose 44 would have to be adapted for connecting to the multiple fittings or multiple separate hoses could be provided.

When creating coil-to-coil clearance, the expandable container 42 is placed between the adjacent coil end portions 28, 30 in a deflated stage (see in FIG. 6 the container 42 shown with dotted lines) comprising a first height. Then, the expandable container 42 is slowly inflated to a second height, which expands and pushes against the coil end portions 28, 30 to create the proper clearance, i.e. spacing 32. As FIG. 6 clearly shows, a consistent surface area contact 35 between the container 42 and the coil end portions 28, 30 is provided without pressure points on the stator coil end portions 28, 30.

Figure 7:
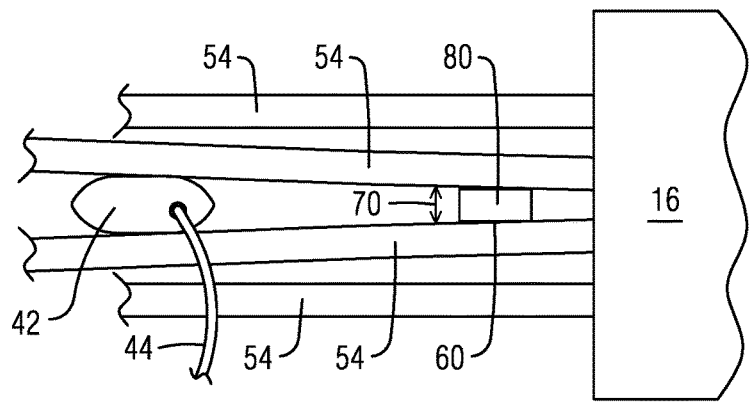
FIGS. 7, 8 and 9 are top views of multiple stator coil end portions in different stages when creating spacing between adjacent end portions in accordance with an exemplary embodiment of the present invention.
Figure 8:
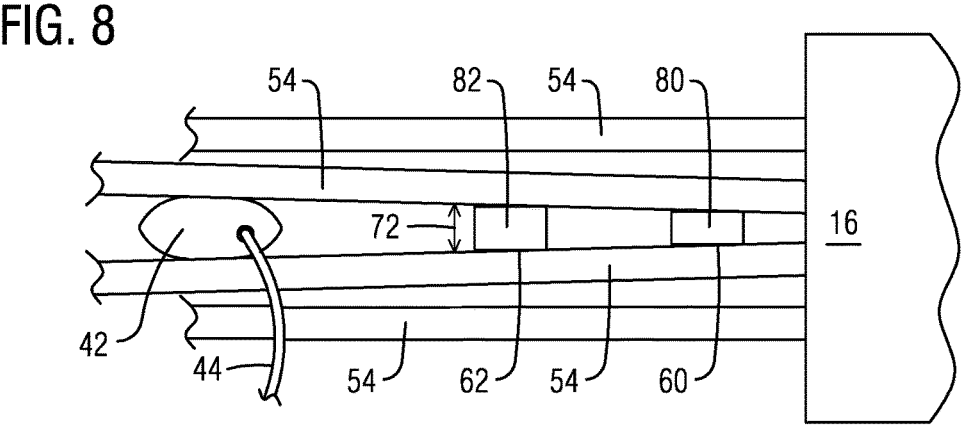
Figure 9:
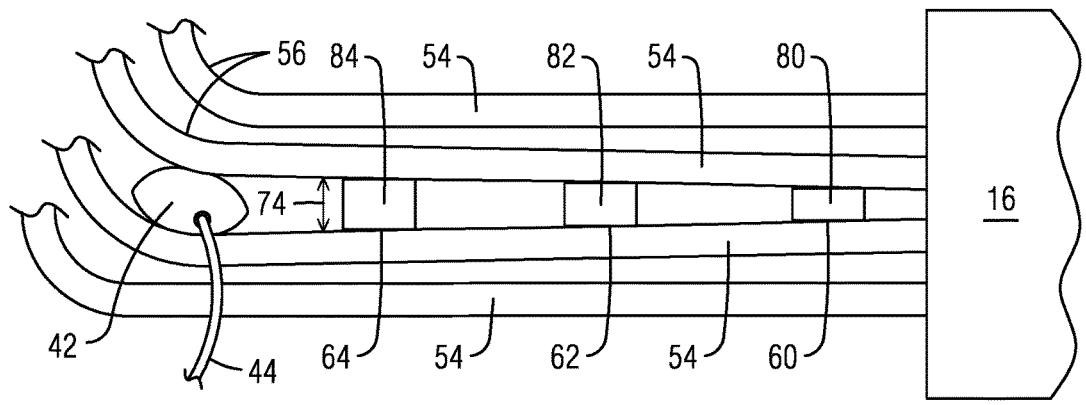

FIGS. 7, 8 and 9 are top views of multiple stator coil end portions in different stages when creating spacing between adjacent end portions in accordance with exemplary embodiments of the present invention.

With reference to FIG. 7, the expandable inflatable container 42 is inserted between two adjacent coil end portions 54 in a deflated stage comprising a first height at a first position which is close to a first location 60 where an insulating element, such as a block or wedge, is to be placed. The container 42 is then gradually inflated to a second height until a first space 70 is created such that a first insulating element 80 with a first defined thickness is able to be placed in between the coil end portions 54 at the first location 60 close the inflated container 42, i.e. to the left or right of the container 42. In a next step, the container 42 is deflated, either completely or only partially, and shifted along the coil end portions 54, specifically outward and away from the stator 16 of the induction machine 10 (see also FIG. 1) to a second position close to a second location 62 for a second insulating element 82. The container 42 is gradually inflated to a third height until the second insulating element 82 with a second defined thickness is able to be placed in a second space 72 created between the coil end portions 54 at the second location 62, see FIG. 8. Then, the container 42 is deflated again, either completely or partially, and shifted further along the coil end portions 54 towards turns 56 of the end portions 54, also known as knuckles. The container 42 is slowly inflated again until a third space 74 is created allowing positioning of a third insulating element 84 with a third defined thickness at a third location 64, see FIG. 9. The defined thickness of the first, second and third insulating elements 80, 82, 84 can be equal or different depending on for example type and design of the stator winding. For Example, the thickness of the second insulating element 82 can be greater than the thickness of the first insulating element 80. But there can be designs where the thickness of the second insulating element 82 is equal to the thickness of the first insulating element 80. One of ordinary skill in the art understands that more or less than three insulating elements with equal or different heights/thicknesses can be placed between the end portions 54 depending on for example the type of winding and/or the winding process. The locations and number of insulating elements is indefinite. When all insulating elements are positioned between the coil end portions 54, the expandable container 42 is deflated enough to be removed from the end portions 54. The described method for creating spacing and inserting insulating elements between stator coil end portions is repeated until all required insulating elements are placed between the stator coil end portions. For example, insulating elements can be placed between all the stator coil end portions of a stator winding.

The presented spacing device 40 can be used on many different stator designs of many different electrodynamic machines, for example flat wire stator designs that require a defined coil-to-coil spacing to be created. The spacing device 40 improves the overall quality of the process of creating spacing, being minimally evasive to the stator coils 18, in particular the stator coil end portions 19, and also improves the process from a safety perspective by greatly reducing the need for operators to exert excessive force on their joints when attempting to separate coils from one another using the existing z-bar or similar prying tools.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

The invention claimed is:

1. A method for creating spacing between insulated stator coils comprising:
    positioning an expandable container between stator coil end portions;
    inflating the expandable container between the stator coil end portions thereby creating a first space between the stator coil end portions;
    placing a first insulating element in the first space between the stator coil end portions at a first location, wherein the first insulating element is permanently placed between the stator coil end portions;
    deflating the expandable container either completely or only partially;
    after deflating the expandable container, shifting the expandable container along the stator coil end portions outward and away from a stator of an induction machine;
    inflating the expandable container again; and placing a second insulating element in a second space between the stator coil end portions at a second location, wherein the second space is different from the first space and wherein the second insulating element is permanently placed between the stator coil end portions.

2. The method of claim 1, further comprising:
moving the expandable container between the stator coil end portions, repeating the steps of positioning and inflating the expandable container, and placing two or more insulating elements between the stator coil end portions.

3. The method of claim 1, further comprising:
removing the expandable container from the stator coil end portions.

4. The method of claim 1, wherein the first insulating element is designed as a wedge or block.

5. The method of claim 2, wherein the two or more insulating elements each comprise a defined thickness, the defined thicknesses being equal or different from each other.

6. The method of claim 1, further comprising:
coupling the expandable container to a fluid supply, wherein the fluid supply comprises compressed air or gas for the inflating of the expandable container.

7. A method for creating spacing between insulated coils comprising:
providing a spacing device comprising an expandable container;
positioning the expandable container between coil end portions of the insulated coils;
expanding the expandable container between the coil end portions and creating a first space between the coil end portions;
placing a first insulating element in the first space created between the coil end portions at a first location, wherein the first insulating element is permanently placed between the coil end portions;
deflating the expandable container either completely or only partially;
after deflating the expandable container, shifting the expandable container along the coil end portions outward and away from a stator of an induction machine;
inflating the expandable container again; and
placing a second insulating element in a second space between the coil end portions at a second location, wherein the second space is different from the first space and wherein the second insulating element is permanently placed between the coil end portions.

8. The method of claim 7, further comprising:
contracting the expandable container between the coil end portions, and removing the expandable container from the coil end portions.

9. The method of claim 7, wherein the spacing device further comprises a regulator and a measuring device used for the expanding of the expandable container to a predefined pressure.

10. The method of claim 7, further comprising:
providing a fluid supply; and
operably coupling the fluid supply to the spacing device, wherein the expandable container of the spacing device is expanded by a fluid provided by the fluid supply.

* * * * *